Jan. 23, 1934.   H. J. STEGEMAN ET AL   1,944,584
POWER DRIVEN LAWN MOWER
Filed July 1, 1931   5 Sheets-Sheet 5

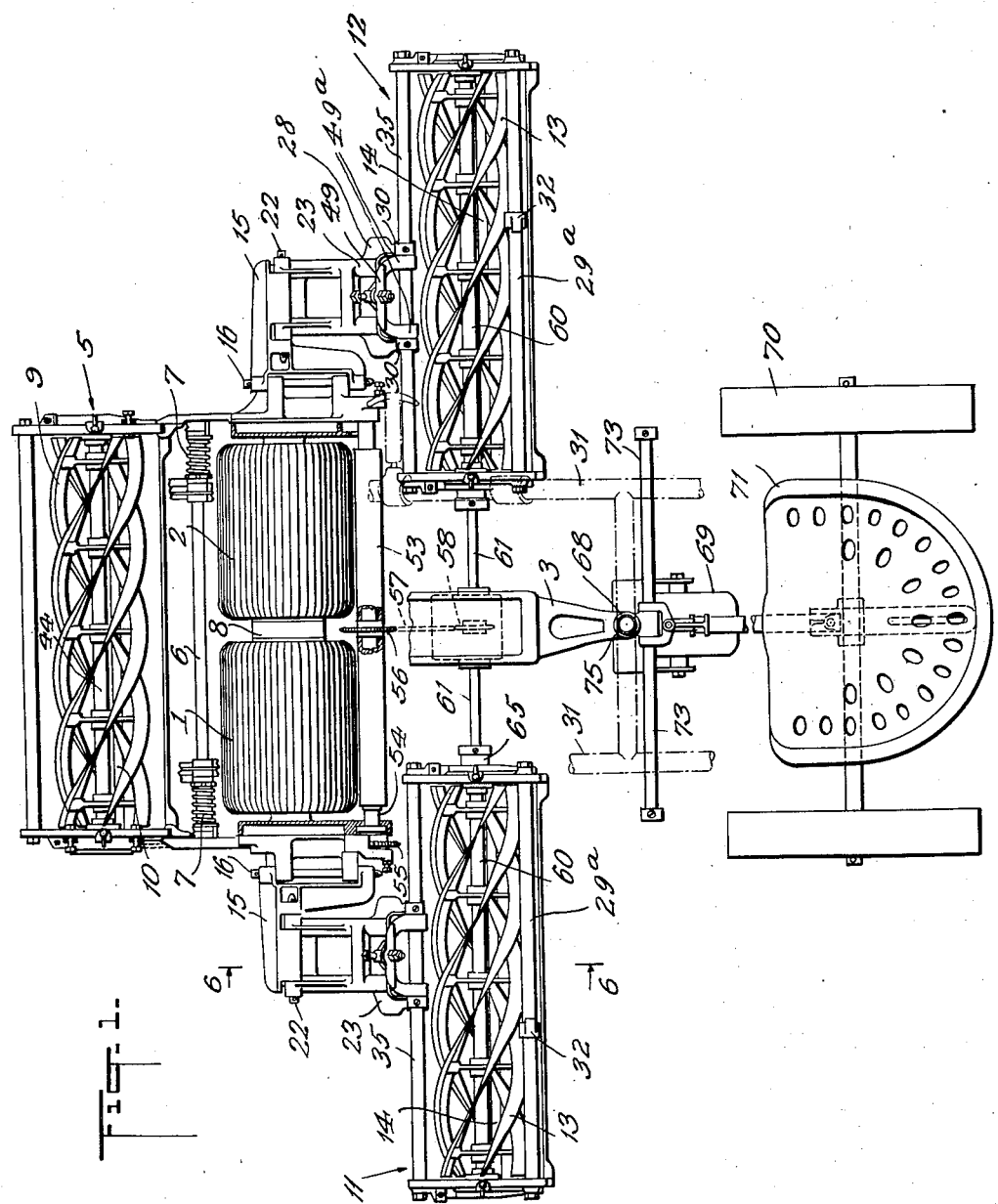

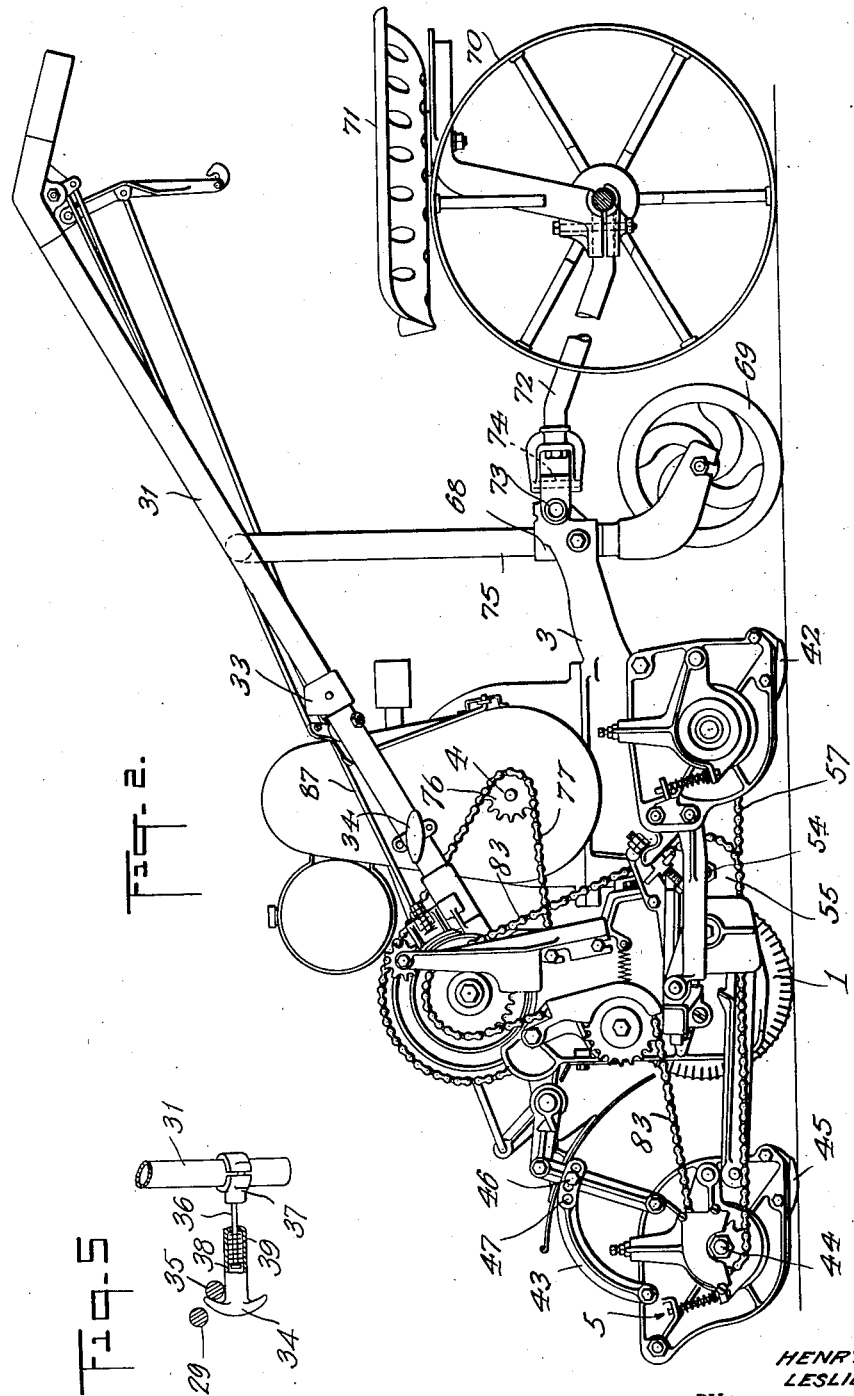

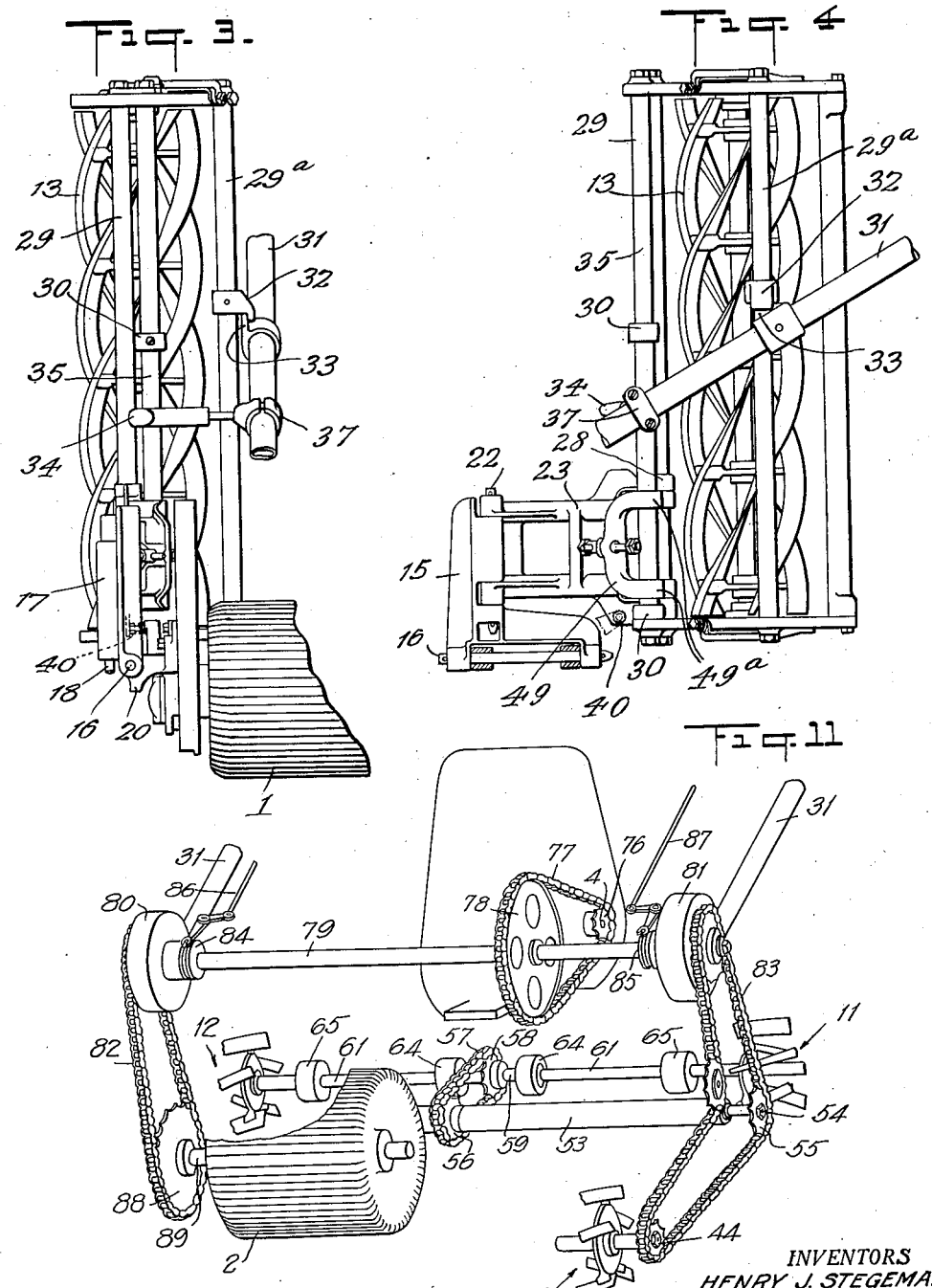

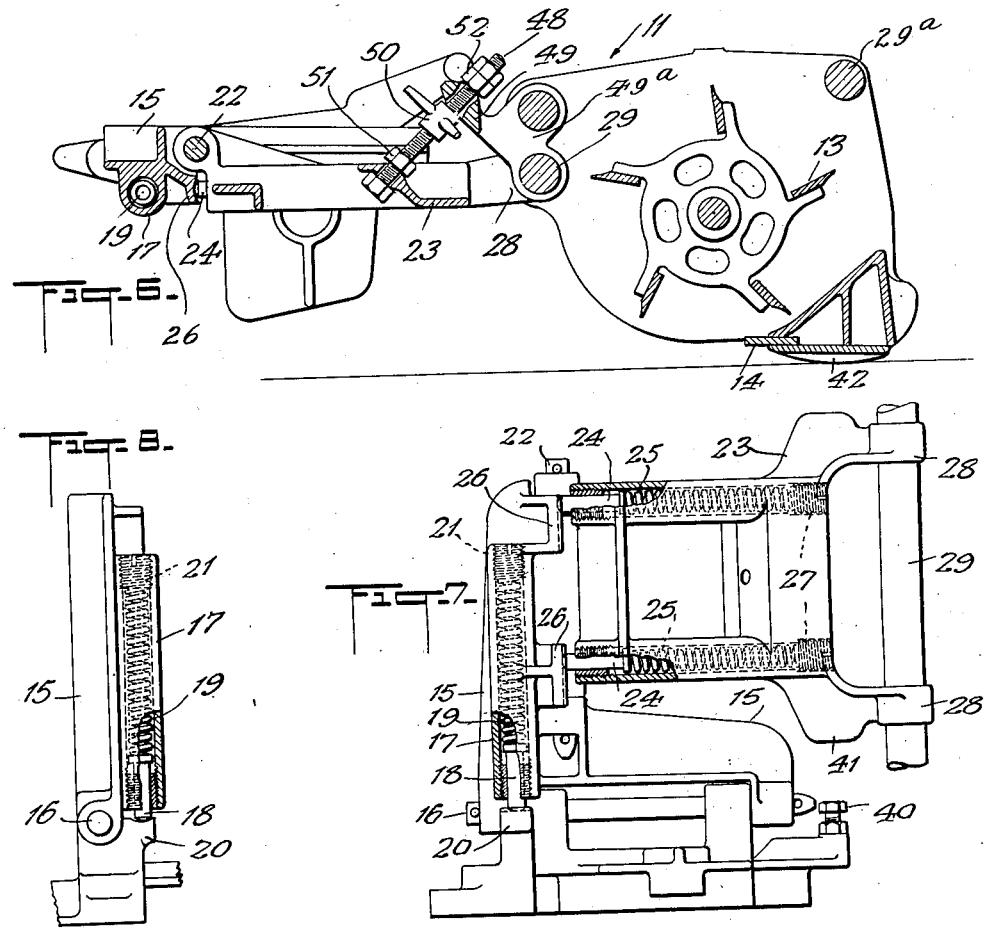
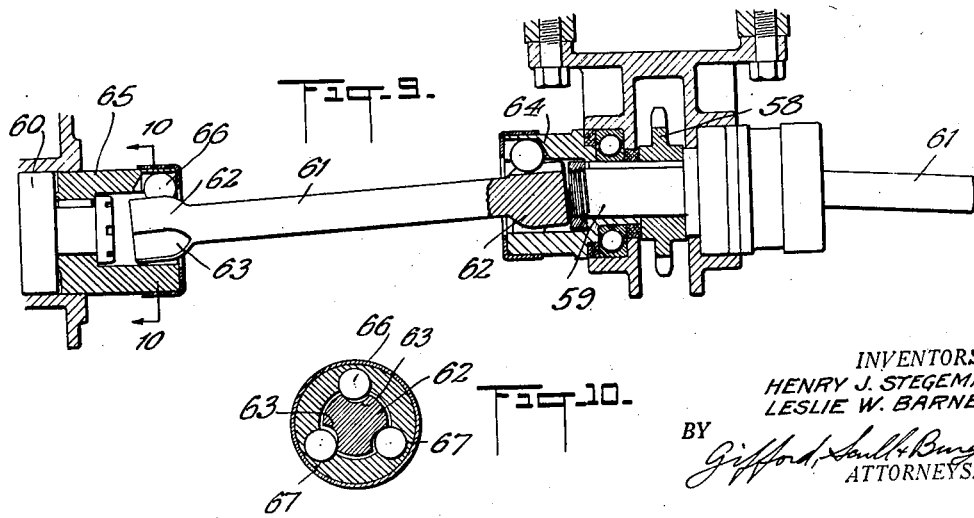

INVENTORS
HENRY J. STEGEMAN.
LESLIE W. BARNES.
BY
ATTORNEYS

Patented Jan. 23, 1934

1,944,584

UNITED STATES PATENT OFFICE 1,944,584

POWER-DRIVEN LAWN MOWER

Henry J. Stegeman, Fairfield, and Leslie W. Barnes, Trumbull, Conn., assignors to The Locke Steel Chain Company, Bridgeport, Conn., a corporation of Connecticut Application July 1, 1931. Serial No. 548,116

54 Claims. (Cl. 56—7)

This invention relates to a novel and improved form of lawn mower, more particularly of the power-driven type, and the novel features will be best understood from the following description and the annexed drawings, in which we have shown a power-driven mower having therein selected embodiments of said novel features.

Referring to these drawings:

Fig. 1 is a plan view of a lawn mower constructed according to our invention, parts being omitted and other parts being broken away and shown in section for the sake of clearness;

Fig. 2 is a view of the mower appearing in Fig. 1 as viewed from the left of that figure;

Fig. 3 is a view on an enlarged scale showing one of the side or rear cutters folded into inoperative position;

Fig. 4 is a view taken from the right of Fig. 3, parts being omitted and other parts shown in section for the sake of clearness;

Fig. 5 is a detail view showing the construction of the retaining means appearing in Figs. 3 and 4;

Fig. 6 is a section approximately on the line 6—6 of Fig. 1;

Fig. 7 is a detail plan view, parts being broken away and shown in section, and illustrating the counter-balancing means for one of the side or rear cutters;

Fig. 8 is a fragmentary view taken from the left of Fig. 7;

Fig. 9 is a section taken longitudinally of the driving connection between one of the side or rear cutters and the driving shaft therefor;

Fig. 10 is a section on the line 10—10 of Fig. 9;

Figure 11:
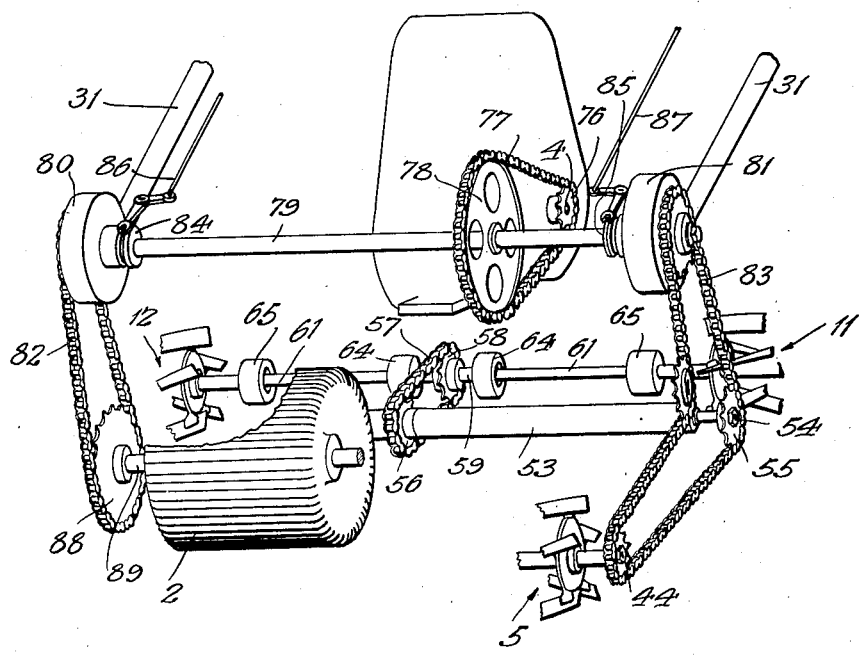
Fig. 11 is a perspective fragmentary view showing the driving means for the cutters and the controlling means therefor.

The mower forming the subject matter of this application is a development of the mower described and claimed in the copending application of Sylvanus D. Locke and Henry J. Stegeman, Serial No. 299,658, Patent No. 1,886,408. Many of the parts shown in this application are shown in greater detail in the aforesaid copending application, and, therefore, will not be described in great detail herein.

The mower comprises a pair of ground-engaging tractor rolls 1 and 2 supporting a frame 3 upon which is carried a suitable motor having a shaft 4 which, through suitable mechanism, drives the tractor rolls 1 and 2 and a cutter designated generally at 5. This cutter is pivotally mounted on the frame, being supported on a rod 6 and being counter-balanced by means of springs 7 which tend to lift the cutter and thus transmit a substantial amount of the cutter weight to the rolls 1 and 2. These rolls are driven together through a differential connection 8, the details of which need not be further described here. It is sufficient to say that this differential permits relative rotative movement between the rolls 1 and 2 to facilitate a turning movement of the mower.

It will be seen that the knives 9 of the cutter 5 are wider than the combined width of the rolls 1 and 2, so that when the mower is moved forwardly, the rolls will stay in the path or swath cut by the knives 9. It is, of course, understood that the knives 9 are rotating knives cooperating with a stationary knife 10 in a well known manner.

Mounted on the sides of the mower, and to the rear of the rolls, is a pair of laterally extending cutters 11 and 12. Each of these cutters is provided with rotary knives 13 and a stationary knife 14 which cooperate to cut grass in the usual manner.

It will be seen that the knives on the cutters 11 and 12 extend behind the rolls 1 and 2, so that they overlap the knives on the cutter 5, thereby making a swath cut by the mower equal to the overall distance between the outer edges of the knives on the cutter 11 and the knives on the cutter 12.

Each of the side cutters, as they will be termed for convenience, is supported on the frame of the mower in such a way as to be counterbalanced and thereby to transmit a large portion of its weight to the frame and, consequently, to the rolls 1 and 2, thereby making a mower in which all of the cutters thus transmit a large portion of their weight to the tractor rolls and increase the tractive power of the rolls. The arrangement for thus mounting the side cutters is best shown in Figs. 1, 3, 4, 7, and 8, and referring thereto, it will be seen that each cutter is supported on a bracket 15 mounted on a pivot 16 extending longitudinally of the mower, by which is meant parallel to the direction of travel of the mower.

The construction supporting the cutters is identical on both sides of the mower, and, therefore, the description will be limited to one side only.

On the underside of the bracket 15 is a cylinder 17 having slidably mounted therein a plunger 18 which is urged by a spring 19 into contact with an abutment 20 on the frame. This spring is made of sufficient strength to transmit the desired load to the frame, and the spring may be adjusted by means of a screw 21.

Extending at right angles to the pivot 16 is a second pivot 22 on the bracket, and on this pivot is mounted a second bracket 23. This bracket is provided on its underside with spring-pressed plungers 24 operated by springs 25 in the same manner as is described above in connection with the plunger 18. The plungers 24 have their ends bearing against abutments 26 on the bracket 15, and the springs 25 may be adjusted by means of the screws 27.

At the rear end, each bracket 23 is provided with spaced ears 28, which are apertured to receive a rod 29 on one of the side cutters. Collars 30 (Fig. 1) may be provided on the cutter 12 to contact with the ears 28, and hold the cutter in desired position.

From what has been said it will be apparent that the brackets 15 and 23 are really cantilevers. In connection with each bracket, the spring or springs form the compression members. That is, spring 19 is the compression member of the cantilever or bracket 15, while springs 25 together form the compression members of the cantilever or bracket 23.

By the above arrangement, it will be seen that the weight of the cutter is transmitted first to the abutments 26 and then to the abutment 20, and thus to the frame and the tractor rolls. This materially increases the traction of the rolls and at the same time avoids an undue amount of weight on the ground at the cutters, so that the cutters may be easily moved over the ground during cutting operations.

The above arrangement also is of advantage when it is desired not to use the side cutters. The collar 30 nearest the mower frame may be loosened, and then the cutter may be slid outwardly until it has reached a position where it may be folded upwardly, as shown in Figs. 3 and 4. The swinging movement is around the pivot 16, as most evident from Fig. 3.

The mower is guided by handles 31, and when the side cutters are rendered inoperative in the manner just described, they are held in inoperative position by means detachably securing them to the handles, it being understood that the handles form a convenient part of the frame which is used for this purpose.

On each rod 29ª is a lug 32 adapted to engage a cooperating lug 33 on the handle. The arrangement is one in which the cutter is lifted to such a position that the lug 32 is above the lug 33, and then the cutter is dropped so that these two lugs overlap, as shown in Figs. 3 and 4.

The cutter may be further held in position by means of a spring-pressed latch 34, this latch having a hook adapted to engage a rod 35 on the cutter frame. The hook is swiveled to a rod 36 which, in turn, is connected to a collar 37 on the handle 31.

The rod 36 extends within the shank 38 of the hook, and a spring 39 is provided to hold the hook in tight engagement with the rod 35. It will be noted that in the form shown, this hook 34 is double, so that it may be conveniently hooked over the rod 35 or other element on the mower from any one of several positions. When the side cutters are folded up, they are also held rigid by the action of the spring 39 or the like against a stop 40 (Figs. 3 and 7). This stop is shown as being in the form of a screw threaded into the frame and adapted to engage a part 41 on the bracket 23. By this arrangement, a side cutter, when not in use, will be held without substantial vibration.

Each cutter is of a construction similar to that shown in Fig. 6, in which the stationary blade or knife is shown as mounted on a ground-engaging shoe 42, this shoe preferably being made of bronze and of the kind described in the aforesaid copending application, namely, of the kind supplied with grooves extending parallel to the direction of movement of the mower.

By providing the counterbalancing arrangement described, it is feasible to use such a shoe instead of a roller which is generally considered necessary when the weight of the cutter is to be borne entirely by its ground-engaging portion. By the counterbalancing arrangement shown, however, a greater proportion of the weight of each cutter is transmitted to the tractor rolls, and, therefore, a roller on the individual cutter may be dispensed with. At the same time, it is possible to place the pivots connecting a side cutter to the frame off-center with respect to the center of gravity of that cutter.

In this connection it is to be understood that the screws 27 are manipulated to tension the springs 25 whereby to remove the desired load or amount of weight from the shoe 42. That is, a considerable portion of the total weight of each of the cutters 11 and 12 is taken up by the springs 25 of the respective brackets 23 and through the plungers 24 transmitted to the bracket 15.

After this adjustment has been made, the screw 21 is operated to tension the spring 19 to the desired extent to have said spring transmit a portion of the weight to the lug or stop 20 on the frame 3. Since the pivot 16 is considerably off center as regards the cutter, the spring 19 is adjusted to compensate for this off-center mounting whereby to prevent the cutter from dragging or cutting closer at one end than the other.

Due to the off-center-mounting of the cutters, they may be folded or pivoted into inoperative position relatively close to the main frame of the mower when not in use or for packing for shipment or when in a tool shed or the like or when moving from place to place or when the mower is being used to cut in a restricted place.

When using a mower with a plurality of cutters, there is likelihood and, in fact, probability that the different cutters will not cut the grass to the same height. This trouble has been overcome by us in the following manner.

As described in the aforesaid copending application, the height of cut of the cutter 5 may be controlled by the adjusting means exemplified by the arm 43 (Fig. 2), the movement of which causes rotation of the shaft 44, carrying the knives 9, about the ground-engaging shoe 45.

The arm 43 is held in adjusted position as by means of a screw or bolt 46 engaging in one of the holes 47 through the arm 43. This adjustment is a relatively coarse one, but is sufficient for all practical purposes. We use this adjustment as the controlling one to determine the height of cut which it is desired to have, and then we provide precision adjustments for the side cutters, which adjustments may bring the height of cut for those cutters to exactly the same height as for the cutter 5. The precision adjustment referred to is shown especially in Figs. 2 and 6.

In Fig. 6 is shown the cutter 11 supported by the rod 29 passing through the ears 28, as previously described. In order to vary the height of cut made by the knives 13 and 14, we provide means for rocking the cutters 11 and 12 on their ground-engaging shoes 42 to dispose the cutting edges of their stationary knives 14 closer to or farther from the ground whereby to obtain a shorter or longer cut. This means may comprise a precision screw 48 passing through a hole in the bracket 23 and a hole in a yoke or arm 49 arranged between the ears 28 of the bracket 23 and having two double ears 49$^a$ each disposed on both of the rods 29 and 35 whereby not to be rotatable on or relative to the cutter.

Threaded on the screw 48 is an adjustment nut 50, and when this nut is moved upwardly against the yoke 49, the result is to rotate the cutter about the rod 29 as a pivot or axis. Since the shoe 42 is in contact with the ground, this rotation results in a rocking of the cutter on the arcuate surface of the shoe to raise the stationary cutting knife away from the ground. This operation involves a raising of the bar 29 and, of course, as the sharp edge of the stationary cutting knife moves upwardly, the length of the cut will be increased. A reverse movement of the nut 50 will naturally result in the cutter rocking in the opposite direction to dispose the sharp edge of the stationary knife closer to the ground whereby a closer or shorter cut will be obtained. Usual and suitable locking nuts 51 and 52 are provided.

By the above arrangement, which constitutes an adjustable toggle, it will be seen that the initial height of cut which is desired may be obtained by adjustment of the front cutter, and then the precision adjustment may be used to make the side cutters give the same height of cut. In this way, a uniform height of cut may be obtained for the whole mower.

Before the side cutters 11 and 12 are folded or swung to their positions at the side of the frame 3, the nut 50 should always be threaded downwardly on the screw 48 to have the nut 50 abut against the locking nut 51. This is done in order that the cutter may rock about the bar 29 as a pivot and collapse or move the cross bar or yoke 49 downwardly on the screw 48. As the cutter is swung upwardly on the pivot 16, the lug 41 on the bracket 23 engages the stop 40, and as the cutter is then forced inwardly in the direction of the frame 3, the toggle, of which the cutter is one part and the bracket 23 the other part, is broken and the bar 49 moves in the direction of the locking nut 51. The action of the lug 41 and stop screw 40 results in the springs 25 being compressed, and these springs cooperate with the hook or holding means 34 to assist in preventing rattle.

Spring 39, of course, tends to pull the cutter toward the frame 3 and thereby maintains the cross bar 49 in contact with the nut 50 whereby to yieldingly prevent movement of the cutter relative to the bracket 23. Ordinarily, the nut 50 may remain threaded against the lock nut 51, and adjustment of the cutter may be taken care of by the lock nut 52. That is, the lock nut 52 may be threaded against the bar or yoke 49 to tilt the stationary cutting blade 14 in the direction of the ground, or it may be threaded away from the bar to permit the cutter to rock in a direction to elevate the blade 14 relative to the ground. When cutting on usually heavy turf, the nut 50 should be against the yoke 49 as shown in Fig. 6 whereby to prevent rocking of the cutter in a manner to cut scallops in a lawn.

In order that the cooperating lugs 32 and 33 may have permanent positions on the rod 29$^a$ and the handle 31, it is necessary that the yoke or bar 49 always move to the same position when the cutter is folded against the frame. It is for this reason that the nut 50 is always threaded back to the same position or that means are provided whereby the yoke or bar 49 always moves to the same position when the cutter is folded against the frame. The latch 34 so holds the cutter that the cutter may not move up and down as the mower passes over uneven ground as when it is being transported to a tool shed or the like. Should the cutter move upwardly to disengage its lug 32 from the lug 33, it will be apparent that it might fall or swing outwardly and be seriously damaged.

We have devised a novel form of connection by means of which the side cutters may be driven. It should be noted that the manner in which these cutters are mounted makes it possible for them to accommodate themselves to the ground over which they pass, the supporting connection for each cutter being in the form of a universal connection permitting movement of the cutter freely to accommodate itself to the ground.

We provide a driving connection which will not only permit this movement of the cutter without strain on the connection, but will also be easily and automatically rendered inoperative when the cutter is folded to inoperative position. This connection will now be described.

Referring particularly to Figs. 1, 2, 9, and 10, it will be seen that we have used the cleaning roll 53 as a convenient driving means for the side cutters. This cleaning roll is mounted on a shaft 54 (Figs. 1, 2, and 11), which is positively driven by a sprocket 55 which engages a chain driven from the shaft 4 through intermediate driving connections, which are shown in Fig. 11 and will be further described later.

Mounted on the cleaning roll between the tractor rolls is a sprocket 56 engaging a chain 57 which also runs over a sprocket 58 on a transverse shaft 59 supported on the frame of the mower, as shown in Figs. 9 and 11.

In Fig. 9, one of the connections to a side cutter is shown in section, and part of the other in elevation, and since these connections are identical, the description of one will suffice.

The shaft 60 of each of the side cutters is normally disposed substantially in line with the shaft 59, variations taking place due to inequality in the ground, and the two shafts are connected together by a shaft section 61 having enlarged ends 62 in which are formed longitudinally extending grooves 63, these grooves being openended as plainly shown in Fig. 9.

Each of the ends 62 is received within a cage, the cage 64 being secured to the shaft 59 and the cage 65 being secured to a shaft 60, so that these two cages rotate with the respective shafts. In each cage is a plurality of driving members 66, here shown as balls, and each member is rotatably mounted in one of the grooves 63. As plainly shown in Fig. 10, these members are prevented from dropping out of the cages, but are normally free to rotate in the recesses 67 in which they are located.

By the above arrangement, when one of the side cutters is lifted to inoperative position, or rather when it is moved outwardly preparatory to being lifted to such position, the section 61 will automatically drop out of place, or at least will become disconnected. At the same time, the desired flexibility of drive is achieved, and the connection may be readily and quickly renewed when the occasion requires.

The drive is also one which does not tend to resist the lifting or depressing of the cutter driven thereby and does not therefore prevent the cutter from rising and falling to follow the contour of the ground. In many types of flexible drives, the torque transmitted tends to bind the joints and prevent the necessary lengthening and shortening of the connections. When the mower unit rises or falls, due to inequalities in the ground over which it is passing, practically in a vertical plane, the distance between the end of the cutter shaft and the end of the propelling shaft is lengthened or shortened. The ball key, used as a spline, permits free longitudinal movement in the joints and no end thrust is developed. A flat key, used as a spline, would tend to bind when the torque is applied and the end thrust would prevent the free rising and falling of the cutter as it attempted to follow the contour of the ground.

It will be noted that the pivot 22 for the cutter is relatively low and nearly in line with the center of the cutter. Therefore it will be appreciated that there will not be any excessive endwise movement of the shafts 61 in the cages 65. For this reason a flexible driving connection as described is possible.

Referring now to Figs. 1 and 2, it will be seen that the rear of the frame 3 has a vertically extending bearing 68 in which is pivoted a caster 69. To the frame is secured a sulky comprising the usual wheels 70 and seat 71. The tongue 72 of the sulky is secured to the bearing 68 by a horizontal pivot 73 and a vertical pivot 74 so as to give universal movement between the sulky and the frame of the mower.

The pivot 73 is in the form of a bar or rod extending through the bearing 68 and forming foot rests for the driver sitting on the seat 71. By this arrangement, it is possible for the driver to readily steer the mower by exerting pressure with one foot or the other on opposite sides of the vertical pivot 75 of the caster.

This steering mechanism is rendered still easier by the presence of the differential drive and by the fact that the weight of all cutters is transmitted in large extent to the tractor rolls. The weight is carried to some extent by the caster 69, and a driver may vary the amount of this weight by throwing his weight backward in the sulky, thus tending to lift the pivot 73.

Referring now particularly to Fig. 11, we have shown therein, in diagrammatic and perspective forms, the means for driving the various elements and for controlling the driving means. As stated above, the driving is all done from the shaft 4 of the motor. This shaft has on its end a sprocket 76 over which runs a chain 77 engaging a sprocket 78 on the transversely extending shaft 79. On opposite ends of this shaft are clutches 80 and 81, the details of which may be of any suitable construction. It is sufficient to say that the clutches control operation of the sprockets which engage chains 82 and 83, respectively. If desired, the clutches may be of the form described in the aforesaid copending application of Locke and Stegeman, Serial No. 299,658, Patent No. 1,886,408, and may be operated in the manner described in that application, as by sliding the collars 84 and 85 by operating rods 86 and 87 which may extend generally parallel to the handles 31 to a position conveniently reached by the operator.

The chain 82 engages a sprocket 88 on the shaft 89 and drives the same. The tractor rolls 1 and 2 are free on the shaft 89 and are driven by the shaft through the differential 8 which is keyed to the shaft. The purpose of the differential is to permit the rolls to rotate at different relative speeds or faster or slower than the propelling shaft 89. In making short turns, the inside roll may turn backward or in a direction opposite to the direction of rotation of the outside roll or shaft. The drive just described may be controlled through the clutch 80 at the will of the operator.

The chain 83 engages the sprocket 55 to drive the cleaning roll 53, and this, in turn, drives the cutters 11 and 12 in the manner described above. The same chain drives the cutter 5 by engagement with the sprocket 44. The clutch 81 may be connected or disconnected at the will of the operator.

Thus, it will be seen that the arrangement is one which is very flexible. When it is desired to move the mower, this may be done by operating the clutch 80 to connect the tractor rolls, at the same time disconnecting the clutch 81 so that the cutters will not be operated. Similarly, the cutters may be operated independently of the tractor rolls, either when the mower is stationary, or when the tractor rolls are slowed down by slipping the clutch 80.

The fact that the cutters may be driven independent of the tractor rolls is of particular importance since the power-driven cutters may be driven at full speed regardless of the forward or turning movement of the tractor. This is of importance, for example, when turning the mower about during a mowing operation. While turning the machine, the tractor rolls are not driven, and, as a matter of fact, are moving slowly and one may be rotating backwardly. Therefore, should the drive of the cutters be dependent on rotation of the tractor rolls, the cutters would be rotated so slow as not to cut the grass over which they were passing and the shoes 42 of the side cutters in particular would slide over and press down uncut grass. However, since the cutters are driven at their usual speed while the machine is turning or being turned, the grass in front of the ground-engaging shoes is always cut.

The above are only examples of the results which may be obtained by the flexible arrangement shown. A unitary drive is provided for all three cutters, so that they will operate positively and in unison under all conditions.

Our cleaning roll 53 is formed of rubber or other yielding or compressible material and while disposed on the shaft 54 to normally turn with the shaft is not glued or cemented or otherwise positively secured thereto whereby it may slip on the shaft as a safety factor for the mechanism of the machine. It will be understood that this cleaning roll is driven in a direction the reverse of the forward or normal direction of rotation of the tractor roll and will therefore effectively function to remove wet grass or the like from the tractor rolls while the machine is moving forwardly and the cutter is driven.

However, when the mower is being transported and the clutch 81 is disengaged and the cutting knives are not being driven, the cleaning roll will not be driven. Therefore, stones or the like picked up by the tractor rolls will not be brushed off, but will tend to move between the cleaner roll and the tractor rolls and will compress an area of the rubber forming the cleaning roll. When this compressing of the rubber or other resilient material forming the cleaning roll reaches a certain point, the rubber will react and the stones or other hard objects will be ejected. Since the cleaning roll yields to these hard objects, the rolls or their connections or shafts will not be damaged by the entrance of hard objects between the cleaning roll and the tractor rolls.

While we have shown our invention as embodied in a certain form, it is to be understood that other embodiments may be built, without departing from the scope of the invention as defined in the appended claims.

We claim:

1. In a power-driven lawn mower, a ground-engaging tractor roll having a frame mounted thereon, a plurality of cutters connected to said frame to be moved thereby upon movement of the roll, said cutters overlapping to cut a single swath, and counterbalancing means between said frame and each of said units, said means transmitting to the frame and thus to the roll a substantial amount of the weight of each of said cutters.

2. In a power-driven lawn mower, a ground-engaging tractor roll having a frame mounted thereon, a plurality of cutters connected to said frame to be moved thereby upon movement of the roll, said cutters overlapping to cut a single swath, a motor supported by said frame, a driving connection between the motor and roll, driving connections between the motor and the cutters, and counterbalancing means between said frame and each of said cutters, said means transmitting to the frame and thus to the roll a substantial amount of the weight of each of said cutters.

3. In a power-driven lawn mower, a tractor roll, a motor supported by said roll, a driving connection between the motor and the roll, a frame extending in front of the roll, a cutter carried on said frame and having knives extending laterally beyond the path of said roll, a ground-contacting member on said cutter within the path of said knives, and cutters extending laterally of said roll and disposed rearwardly of and overlapping said first-named cutter, each of said laterally extending cutters having ground-contacting members and knives disposed in front of said members and extending laterally beyond them.

4. In a power-driven lawn mower, a pair of tractor rolls, a motor supported by said rolls, a differential driving connection between the motor and the rolls, a frame extending in front of the rolls, a cutter carried on said frame and having knives extending laterally beyond the path of said rolls, cutters extending laterally from said rolls and disposed rearwardly of and overlapping said first-named cutter, each of said laterally extending cutters having ground-engaging members and knives disposed in front of said members and extending laterally beyond them, and counterbalancing means between said rolls and each of said cutters, said means transmitting to the rolls a substantial amount of the weight of said cutters.

5. In a power-driven lawn mower, a tractor roll, a motor supported by said roll, a frame extending in front of the roll, a cutter carried on said frame and having knives extending laterally beyond the path of said roll, cutters extending laterally from said roll and disposed rearwardly of and overlapping said first-named cutter, each of said laterally extending cutters having ground-engaging members and knives disposed in front of said members and extending laterally beyond them, and counterbalancing means between said roll and each of said cutters, said means transmitting to the roll a substantial amount of the weight of said cutters.

6. In a power-driven lawn mower, a tractor roll having a frame thereon, a motor on said frame, a cutter extending laterally of said frame and supported thereby and comprising a rotary knife, connections between said frame and cutter comprising a pivot extending longitudinally of the mower and a second pivot extending transversely of the mower, and a flexible driving connection from said motor to said knife and adapted to permit limited movement of the cutter on said pivots without breaking the connection.

7. In a power-driven lawn mower, a tractor roll having a frame thereon, a motor on said frame, a cutter extending laterally of said frame and supported thereby and comprising a rotary knife, connections between said frame and cutter comprising a pivot extending longitudinally of the mower, and a flexible driving connection from said motor to said knife and adapted to permit movement of the cutter on said pivot without breaking the driving connection.

8. In a power-driven lawn mower, a tractor roll having a frame thereon, a motor on said frame, a cutter extending laterally of said frame and supported thereby and comprising a rotary knife, connections between said frame and cutter comprising a pivot extending transversely of the mower, and a flexible driving connection from said motor to said knife and adapted to permit movement of the cutter on said pivot without breaking the driving connection.

9. In a power-driven lawn mower, a tractor roll, a frame carried thereby, a bracket extending laterally from said frame and mounted on a pivot extending lengthwise of the mower, a cutter carried by said bracket, the cutter and bracket being rotatable on said pivot to move the cutter between operative and inoperative positions, means for releasably holding said cutter in said inoperative position, a motor carried on said frame, and means to drive said cutter from said motor, said means being rendered inoperative by bringing said cutter to said position.

10. In a power-driven lawn mower, a rotatable shaft extending transversely of the mower, a motor, a driving connection between the motor and shaft, a cutter extending laterally from the mower and having a shaft substantially in alignment with the first-named shaft, a frame, means connecting said cutter to said frame on a horizontal pivot whereby the cutter may be pivotally raised on the frame, and a connection between said shafts automatically disconnected upon raising of the cutter.

11. In a power-driven lawn mower, a frame having a shaft journaled therein, a cutter extending laterally from the frame and having a shaft substantially in alignment with the first-named shaft, means hinging the cutter to the frame on a horizontal pivot whereby the cutter may be raised, and a connection between said shafts comprising a shaft section free to move lengthwise upon said raising of the cutter and to drop out of place upon said raising and said lengthwise movement.

12. In a power-driven lawn mower, ground-engaging means having a frame mounted thereon, a plurality of cutters each supported in part from said frame, means forming a coarse adjustment to vary the height of cut of one cutter, and a relatively fine adjustment to vary the height of cut of each of the other cutters.

13. In a power-driven lawn mower, a pair of tractor rolls, a motor supported by said rolls, a driving connection between the motor and the rolls, a frame disposed in front of the rolls and having a cutter carried thereby, means for adjusting said frame in relation to said rolls to vary the height of cut of said cutter, cutters extending laterally of said frame and disposed rearwardly of said first-named cutter, each of said laterally extending cutters having ground-engaging members and knives disposed in front of said members, and means to adjust each of said cutters to vary the height of cut thereof.

14. In a power-driven lawn mower, a pair of tractor rolls, a motor supported by said rolls, a driving connection between the motor and the rolls, a frame disposed in front of the rolls and having a cutter carried thereby, means for effecting a relatively coarse adjustment of said frame to vary the height of cut of said cutter, cutters extending laterally of said frame and disposed rearwardly of and overlapping said first-named cutter, each of said laterally extending cutters having ground-engaging members and knives disposed in front of said members, and means for performing an accurate adjustment of each of said laterally extending cutters to vary the height of cut thereof.

15. In a power-driven lawn mower, a frame supporting a transversely extending pivot, a cutter disposed rearwardly of said pivot and comprising a ground-contacting member, means connecting said cutter to said pivot comprising a toggle, and means for adjusting said toggle.

16. In a power-driven lawn mower, a frame carried thereby, a bracket extending laterally from said frame and mounted on a pivot extending lengthwise of the mower, a cutter carried by said bracket, the cutter and bracket being rotatable on said pivot to move the cutter between operative and inoperative positions, means for releasably holding said cutter in said inoperative position, and a stop on said frame engaging said bracket when it is raised to said inoperative position.

17. In a power-driven lawn mower, a tractor roll having a frame mounted thereon, a movable lever member yieldingly supported by and projecting from said frame, and a cutter pivotally mounted on said member and largely supported thereby, said cutter comprising a ground-contacting member and knives disposed in front thereof and said pivotal mounting being disposed substantially centrally of said cutter.

18. In a power-driven lawn mower, a tractor roll having a frame mounted thereon, a cantilever projecting from said frame and yieldingly pivoted thereto, and a cutter mounted on said cantilever and largely supported thereby, said cutter comprising a ground-contacting member and knives disposed in front thereof.

19. In a power-driven lawn mower, a tractor roll having a frame mounted thereon, a cantilever projecting from said frame and yieldingly pivoted thereto, and a cutter yieldingly pivoted on said cantilever and largely supported thereby, said cutter comprising a ground-contacting member and knives disposed in front thereof.

20. In a power-driven lawn mower, a tractor roll having a frame mounted thereon, a cantilever projecting from said frame and yieldingly pivoted thereto, and a cutter yieldingly pivoted on said cantilever and largely supported thereby, said cutter comprising a ground-contacting member and knives disposed in front thereof, said first-named pivot extending longitudinally of the mower and the second-named pivot extending transversely thereof.

21. In a power-driven lawn mower, a tractor roll having a frame mounted thereon, a cantilever projecting from said frame and yieldingly pivoted thereto, a cutter yieldingly pivoted on said cantilever and largely supported thereby, said cutter comprising a ground-contacting member and knives disposed in front thereof, a motor on said frame, and a flexible driving connection between the motor and the cutter.

22. In a power-driven lawn mower, a tractor roll having a frame mounted thereon, a bracket mounted on said frame on a pivot extending longitudinally of the frame, a cutter supported on said bracket, and a spring acting between said bracket and said frame and thereby transmitting part of the weight of the cutter to the frame.

23. In a power-driven lawn mower, a tractor roll having a frame mounted thereon, a bracket mounted on said frame on a pivot extending longitudinally of the frame, a spring acting between said bracket and said frame and thereby transmitting part of the weight of the bracket to the frame, a second pivot on said bracket extending transversely of said first-named pivot, a cutter mounted on said second-named pivot, and a spring between said cutter and said bracket and arranged to transmit part of the load of the cutter to the bracket.

24. In a power-driven lawn mower, a tractor roll, a frame carried by said roll and having a motor mounted thereon, a cutter connected to said frame to move therewith, means to drive said cutter from said motor, a caster pivotally mounted on said frame rearwardly of said roll, a sulky pivoted to said frame adjacent said caster on horizontal and vertical pivots, and a foot rest rigid with the frame and extending laterally on either side of said pivots whereby the machine may be steered by pressure applied to the foot rest at one side or the other of the horizontal pivot.

25. In a power-driven lawn mower, one or more tractor rolls, a frame supported on said rolls and carrying a motor, means to drive said rolls from said motor, a plurality of separate cutters mounted on said frame, counterbalancing means transmitting weight from said cutters to said frame, a common driving connection from the motor to said cutters whereby they operate in unison, and means for independently controlling the speed of said tractor rolls and of said cutters.

26. In a lawn mower, a frame, a tractor roll supporting said frame, a bracket extending in a direction transversely of said frame and mounted on a pivot extending in a direction longitudinally of the frame, a cutter supported on said bracket and connected thereto by a transversely extending pivot, and both of said pivots being located to one side of the center of gravity of the cutter, and counterbalancing means to transfer a portion of the weight of the cutter to the frame and thus compensate for the off-center location of said pivots with respect to the center of gravity of the cutter.

27. In a power-driven lawn mower, traction means supporting a frame, a motor on said frame to operate said means, a cutter disposed in front of the traction means, a side cutter supported on the frame rearwardly of the first cutter and extending laterally of the frame, said second cutter being disposed partly behind the front cutter, and driving connections from the motor to said cutters independent of the traction means.

28. In a power-driven lawn mower, a frame supported by a tractor roll, a cutter mounted on said frame and extending laterally thereof, said cutter comprising a rotary cutting element and a cooperating stationary cutting element, a ground-contacting member disposed below and to the rear of the cutting edge of the stationary element and moving within the cut made by said elements, means on the frame attached to the cutter at a point in front of the cutting elements, means between said elements and said point to adjust the distance of the cutting edge of the stationary element from the ground, a motor on said frame, and means independent of each other to drive said tractor roll and said rotary element.

29. In a power-driven lawn mower having a plurality of cutters, a frame supported by a tractor roll, a longitudinally extending pivot on said frame, a bracket extending transversely of the frame and mounted on said pivot, a cutter having a bar extending laterally of the frame, guides on the bracket to slidably receive said bar, means to hold the bar in the guides in desired position, a motor mounted on said frame, and a detachable driving connection between said motor and said cutter.

30. In a power-driven lawn mower, a frame supported by tractor rolls, a motor on the frame and connected to said rolls to drive the same, a cutter disposed in front of said rolls, a second cutter disposed rearwardly of said rolls and overlapping the cut made by the first cutter, flexible driving connections between the motor and said cutters, means connecting the cutters to the frame and permitting limited vertical movement of the cutters with respect to the frame, but preventing transverse movement.

31. In a power-driven lawn mower, a frame supported by tractor rolls, a motor on the frame and connected to said rolls to drive the same, a cutter disposed in front of said rolls, a second cutter disposed rearwardly of said rolls and overlapping the cut made by the first cutter, flexible driving connections between the motor and said cutters, means connecting the cutters to the frame and permitting limited vertical movement of the cutters with respect to the frame, but preventing transverse movement, and counterbalancing means transmitting a substantial portion of the weight of each cutter to the frame.

32. In a power-driven lawn mower, a tractor roll, a frame on said roll, a motor on said frame, a driving connection between the motor and tractor roll, a rotatable shaft extending transversely of the motor, an independent driving connection between the motor and said shaft, a cutter extending laterally from the frame and having a shaft substantially in alignment with the first-named shaft, means connecting said cutter to the frame on a horizontal pivot whereby the cutter may be pivotally raised on the frame, and a connection between said shafts automatically disconnected upon raising of the cutter.

33. In a power-driven lawn mower, a tractor roll, a frame on said roll and carrying a motor, a plurality of separate cutters connected to the frame to move therewith, a driving connection from the motor to the tractor roll, and a common driving connection from the motor to said cutters separate from said first-named driving connection, whereby the cutters may operate in unison and independently of the tractor roll.

34. In a power-driven lawn mower, a pair of tractor rolls, a motor supported by said rolls, a differential driving connection between the motor and the rolls whereby the rolls may rotate independent of each other, a frame extending in front of the rolls, a cutter carried by said frame and disposed in front of the rolls, cutters extending laterally of the frame and disposed rearwardly of the rolls and overlapping the front cutter, and each of said cutters being disposed substantially the same distance from the axis of the rolls.

35. In a power-driven lawn mower, a ground-engaging tractor roll, a motor supported by said roll, a connection between the motor and roll whereby the motor may drive the roll in one direction, a cutter moved by the roll, a cleaning roll for said tractor roll, and a driving connection between the motor and cleaning roll arranged to drive the cleaning roll in a direction such that the adjacent surfaces of the two rolls move in opposite directions, and said cleaning roll being formed of yielding material adapted to be compressed on the entrance of a hard object between the tractor roll and the cleaning roll.

36. In a power-driven lawn mower, a tractor roll, a motor supported by said roll, a driving connection between the motor and roll, a frame extending in front of the roll, a cutter carried by said frame, a cutter disposed laterally of the roll and overlapping the first-named cutter, a driving connection between the motor and the cutters independent of said first-named driving connection, means controlling the driving connection between the motor and the cutters, and other means controlling the driving connection between the motor and the tractor roll.

37. In a power-driven lawn mower, a tractor roll, a motor supported by said roll, a driving connection between the motor and roll, a frame extending in front of the roll, a cutter carried by said frame, a cutter disposed laterally of the roll and overlapping the first-named cutter, a driving connection between the motor and the cutters, means controlling the driving connection between the motor and the tractor roll, a single means controlling the driving connection between the motor and both of said cutters, and said driving connections between the motor and cutters being independent of the driving connection between the motor and the tractor roll.

38. In a power-driven lawn mower, a tractor roll, a motor supported by said roll, a driving connection between the motor and roll, a cutter supported in front of said roll, a driving connection between the motor and cutter, a cutter disposed laterally of the roll and overlapping the first-named cutter, a driving connection between the motor and the second-named cutter, means controlling the driving connection between the motor and the tractor roll, and a single means controlling the driving connections between the motor and both of said cutters.

39. In a power-driven lawn mower, a ground-engaging tractor roll, a plurality of overlapping cutters connected to said roll to be moved thereby, a motor supported by said roll, a driving connection between the motor and roll, other driving connections between the motor and the cutters, and means for independently rendering either of said driving connections operative or inoperative.

40. In a power-driven lawn mower, ground-engaging means having a frame mounted thereon, a plurality of overlapping cutters connected with said frame to be moved thereby, means providing for a coarse adjustment to vary the height of cut of one cutter, and other and independent means providing for a relatively fine adjustment to vary the height of cut of each of the other cutters whereby to bring said other cutters into exact adjustment with the first cutter.

41. In a power-driven lawn mower, a tractor roll having a frame thereon, a cutter connected with said frame to be moved thereby and disposed forwardly of said roll, a motor on said frame, a driving connection between the motor and roll, a pair of cutters disposed laterally of the frame and arranged one at each side thereof and connected with the frame to be moved thereby, and a driving connection between the motor and the cutters whereby the forward cutter may be driven independent of the laterally extending cutters and whereby one of said laterally extending cutters may be driven with the forward cutter and independent of the other laterally extending cutter.

42. In a power-driven lawn mower, a tractor roll having a frame thereon, a cutter connected with said frame to move therewith and disposed forwardly of the roll, a motor on the frame, a driving connection between the motor and the roll, a pair of cutters disposed laterally of the frame and arranged one at each side thereof and connected to the frame to move therewith, a driving connection between the motor and the cutters, and said driving connection including means whereby one of said laterally extending cutters may be driven without driving the other.

43. In a power-driven lawn mower, a tractor roll having a frame thereon, a cutter connected to the frame to move therewith and disposed forwardly of the roll, a pair of cutters disposed laterally of the frame and arranged one at each side thereof and connected to the frame to move therewith, a motor on the frame, a driving connection between the motor and the roll, a driving connection between the motor and the cutters whereby the cutters may be driven independent of movement of the roll, said laterally extending cutters having pivotal connection with the frame whereby they may be moved into an inoperative position at the side of the frame, and said driving connection between the motor and the cutters including means whereby one of the laterally extending cutters may be driven by the motor while the other of said laterally extending cutters is disposed in an inoperative position.

44. In a power-driven lawn mower, a tractor roll, a frame carried thereby, a bracket pivotally mounted on said frame, a cutter carried by said bracket, the cutter and bracket being rotatable on said pivot to move the cutter between operative and inoperative positions, means for releasably holding said cutter in said inoperative position, a motor carried on said frame, and means to drive said cutter from said motor, said means being rendered inoperative by bringing said cutter to said inoperative position.

45. In a power-driven lawn mower, a ground-engaging means having a frame mounted thereon, a plurality of cutters each supported in part from said frame, a single adjusting device associated with each of said cutters and the frame and adapted to vary the height of cut of each cutter, one of said means providing a relatively coarse adjustment to vary the height of cut of the cutter with which it is associated, and the others forming relatively fine adjustments to vary the height of cut of each of the other cutters.

46. In a power-driven lawn mower, a frame supporting a pivot extending transversely of the direction of travel of the mower, a cutter spaced from said pivot in said direction of travel, means connecting said cutter to said pivot comprising a toggle, and means for adjusting said toggle.

47. In a power-driven lawn mower, a frame supporting a pivot extending transversely of the direction of travel of the mower, a bracket mounted on said pivot and extending in said direction of travel, a cutter pivotally mounted on said bracket, and means for adjustably holding said cutter in position on its pivotal connection to the bracket.

48. In a power-driven lawn mower, a frame supporting a pivot extending transversely of the direction of travel of the mower, a bracket mounted on said pivot and extending in said direction of travel, a cutter pivotally mounted on said bracket, and means for holding said cutter in position on its pivotal connection to the bracket, said means comprising a precision adjustment.

49. In a power-driven lawn mower, a frame supporting a pivot extending transversely of the direction of travel of the mower, a bracket mounted on said pivot and extending in said direction of travel, a cutter pivotally mounted on said bracket and means for holding said cutter in position on its pivotal connection to the bracket, said means comprising a screw passing through holes in the bracket and the cutter and having one or more nuts thereon adapted to vary the relation of the cutter to the bracket.

50. In a lawn mower, a roll having a frame supported thereon, a cutter disposed in front of said roll and connected to said frame, said cutter being of such a width that said roll is entirely within the path cut thereby, a bracket mounted on said frame on a pivot extending in the direction of travel of the mower and disposed at the end of said roll, and a second cutter carried by said pivot and extending partially behind said roll and of such a width as to overlap the cut made by said first cutter.

51. In a lawn mower, a roll having a frame supported thereon, a cutter disposed in front of said roll and connected to said frame, said cutter being of such a width that said roll is entirely within the path cut thereby, a bracket mounted on said frame on a pivot extending in the direction of travel of the mower and disposed at the end of said roll, a second cutter carried by said pivot and extending partially behind said roll and of such a width as to overlap the cut made by said first cutter, and means yieldingly supporting said cutters from said frame to transmit a substantial part of the weights of the cutters to the frame.

52. In a lawn mower, a roll having a frame supported thereon, a cutter disposed in front of said roll and connected to said frame, said cutter being of such a width that said roll is entirely within the path cut thereby, a bracket mounted on said frame on a pivot extending in the direction of travel of the mower, a second pivot on said bracket extending transversely of said direction of travel, a second bracket mounted on said pivot and extending rearwardly therefrom, and a second cutter mounted on said second bracket and of such a width as to overlap the cut made by said first cutter.

53. In a lawn mower, a roll having a frame supported thereon, a bracket pivoted on said frame, a cutter having a bar extending transversely of said pivot and slidably mounted in said bracket, and means for securing said bar against sliding movement in the bracket, whereby, upon loosening of said securing means, said cutter may be slid to a position wherein the cutter and bracket may be moved about said pivot.

54. In a lawn mower, a roll having a frame supported thereon, a bracket pivoted on said frame, a cutter having a bar extending transversely of said pivot and slidably mounted in said bracket, means for securing said bar against sliding movement in the bracket, whereby, upon loosening of said securing means, said cutter may be slid to a position wherein the cutter and bracket may be moved about said pivot, a motor supported on said frame, and a driving connection to said cutter from said motor adapted to be rendered inoperative by said movement of the cutter with respect to said bracket.

HENRY J. STEGEMAN.
LESLIE W. BARNES.